Oct. 20, 1942.    T. R. JOHNSON    2,299,092
VEGETABLE DICER
Filed Dec. 9, 1940    2 Sheets-Sheet 1
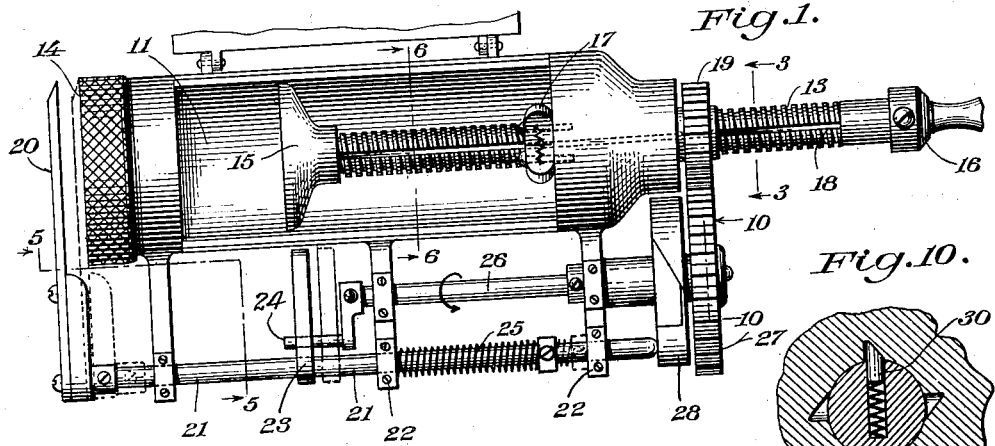
Fig.1.
Fig.10.
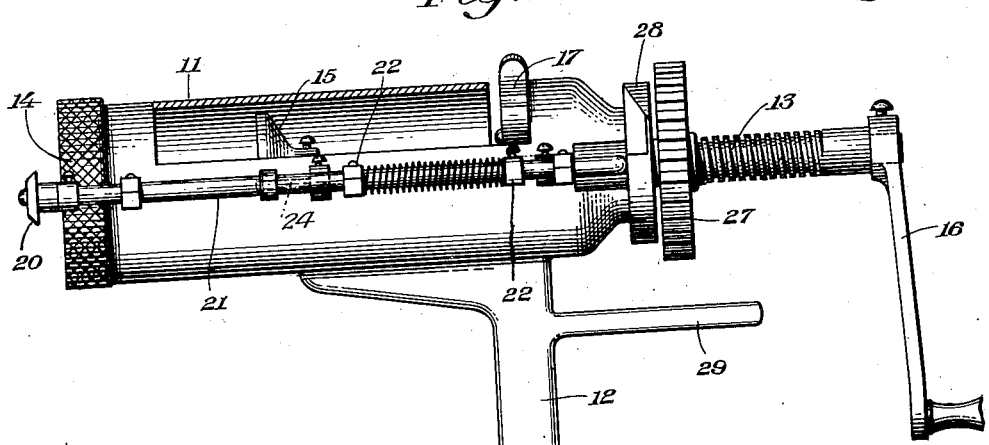
Fig.2.
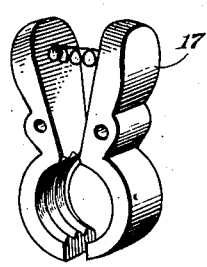
Fig.8.
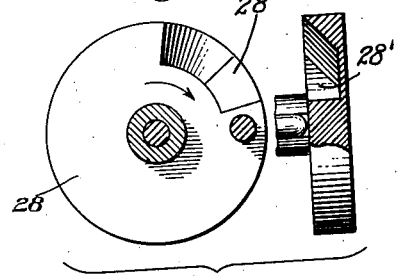
Fig.9.
Theodore R. Johnson INVENTOR
BY Victor J. Evans & Co.
ATTORNEYS Oct. 20, 1942.    T. R. JOHNSON    2,299,092
VEGETABLE DICER
Filed Dec. 9, 1940    2 Sheets-Sheet 2

Theodore R. Johnson,
INVENTOR
BY Victor J. Evans & Co.
ATTORNEYS

Patented Oct. 20, 1942

2,299,092

UNITED STATES PATENT OFFICE 2,299,092

VEGETABLE DICER

Theodore R. Johnson, Menasha, Wis.

Application December 9, 1940, Serial No. 369,310

3 Claims. (Cl. 146—78)

This invention pertains to vegetable dicers, and more particularly to those in which the vegetables are forced through a grille into position to be operated on by a reciprocating knife.

I am aware that many devices of this type have been developed, with varied results. The chief features of such a machine are, whether or not the vegetables are cut cleanly and rapidly, the ease with which the apparatus may be cleaned, and simplicity and economy, all of which may be attained to a greater or less extent. However, no one has attempted, so far as I am aware, to accomplish these beneficial results by the specific and advantageous means embodied in my invention.

The object of this invention is an efficient vegetable dicer.

A further object is a vegetable dicer which may be thoroughly and easily cleaned.

A still further object is a dicer with a minimum of working parts, to prevent mechanical trouble and provide economy of manufacture.

These and other objects may be accomplished by my invention which embodies among its features a casing, a follower in the casing, a screw shaft therefor, a grille in the front end of the casing through which the vegetables are pushed by the follower, a reciprocating knife working in front of the grille, and means reciprocating the knife in such a manner, that it is spaced from the grille on its upward stroke and close to the grille on its downward stroke.

Other objects and features will become evident from the following disclosure when taken in connection with the accompanying drawings, in which:

Figure 1 is a top plan view of my improved dicer.

Figure 2 is a side elevation of the same.

Figure 8 is a perspective view of my journal for the follower screw shaft.

Figure 9 is a front and side view, partly in section, of the cam on the crankshaft.

Figure 10 is a section taken on line 10—10 of Figure 1.

Figure 3:
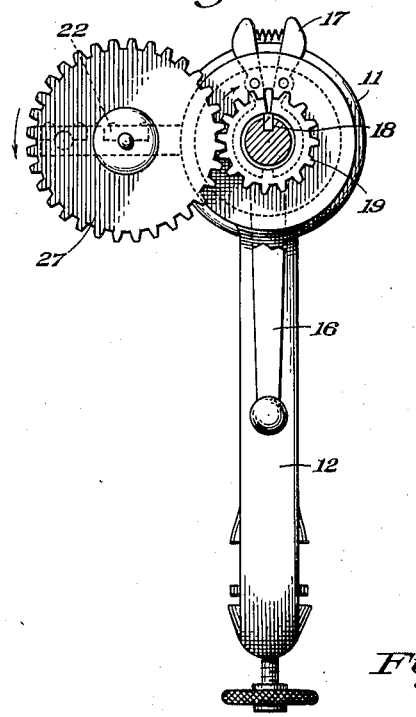
Figure 3 is a cross-section taken on line 3—3 of Figure 1.
Figure 4:
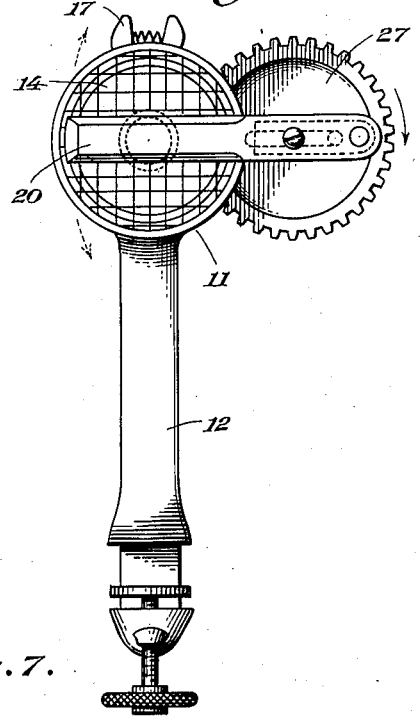
Figure 4 is an end elevation of the device shown in Figure 1.
Figure 7:
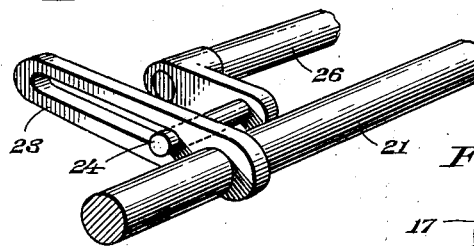
Figure 7 is a perspective view of my slotted lever and crank.
Figure 6:
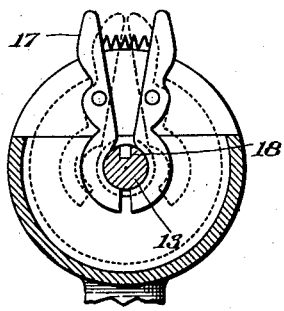
Figure 6 is a section taken on line 6—6 of Figure 1.
Figure 5:
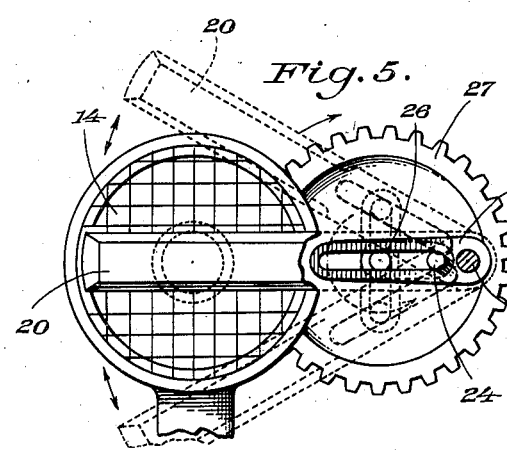
Figure 5 is a section taken on line 5—5 of Figure 1.

Referring to the drawings in detail, a casing 11, supported by table clamp 12, has an open lid on its top and an opening at its rear to support a follower shaft 13. In the front of the casing is a grille 14, removably attached by conventional screw means, suitably meshed so that when the vegetables are pushed therethrough they will be cut to the correct size. A follower 15 is operated by the screw shaft 13 which has a crank 16. On the inside of the casing, surrounding the screw shaft 13, is a clamp device 17 consisting of two half nuts, spring operated for closing and manually operative to open and release the shaft for removal. The shaft is splined as at 18 to operate a pinion 19 for driving the reciprocating knife. Said knife 20 is driven by a shaft 21 slidably and rotatably mounted in journals 22 made integral with the casing. A slotted lever 23 is shrunk on the shaft and is operated by a crank 24 to provide reciprocating motion for the knife. The rear end of the knife shaft is cam operated and the shaft has a spring means 25 to hold it in rearward position, so the knife may have a longitudinal reciprocating motion whereby on the upstroke it is held away from the front of the casing so as to not interfere with the extruding vegetables but, on its downstroke, it works close to the grating.

The gear and cam structure which supports this function is as follows: Crank 24 is operated by crankshaft 26, also journalled on the side of the casing and being driven by pinion 27 which, as may be seen in Figure 10, has a ratchet means 30 to prevent rearward turning of the cam and other parts if the crank is accidentally turned backwards, thus avoiding injury of the device. A cam forming disk 28 is secured on the rearward extension of the shaft 26, adjacent the pinion 27, and is provided with an arcuately shaped depression 28' merging into an inclined portion so as to axially actuate the shaft 21 to dispose the cutter knife in projected and retracted positions successively during each rotation of the cam. Therefore, when the crank 16 is rotated, the follower 15 will push the vegetables forward and the knife, held in forward position by cam 28, will be raised. When the knife reaches the top of its stroke, the depression in the cam will permit the knife to move close to the grille and at the same time the crank 24 will move past its dead center downward and outward with relation to the casing 11 to swing the knife through its downward cutting movement. It will be noted that such downward movement of the crank will cause the crank pin 24 to engage the inner end of the slot in the lever 23 in close proximity to the shaft 21 so as to effect a relatively rapid movement of the knife during the downward cutting stroke, as compared to the slower knife movement during the upward movement when the crank pin engages the slotted lever in a position substantially remote from the axis of the shaft 21. Upon completion of the cutting stroke the inner end of the shaft 21 engages the inclined surface of the cam disk to extend the shaft and knife forwardly and maintain the knife in a forwardly projected position during its return upward movement. Thus, the knife is returned to start the cutting operation without contacting the vegetables or other matter protruding through the front grille of the casing. The projecting element 29 forms a stop engageable with the crank 16 when the latter is in its forward position to preclude forcing the follower or plunger against the grille.

The machine has other uses also. It may be used to cut butter into cubes, by changing the shape of the casing and utilizing thin steel wire for the grille and the knife. With the knife removed, it can cut vegetables into long strips such as shoe string potatoes.

Accordingly, it will be seen that I attain a smooth dicing action by a machine that uses comparatively few parts and may be readily dismantled and cleaned. Although a preferred embodiment is disclosed herein, I do not wish to be limited thereto, but only by the scope of the appended claims.

What is claimed is:

1. In a device of the character described, an elongated tubular casing having a cutting grille in the front thereof, a screw shaft mounted axially through the rear end of the casing and adapted for endwise movement upon rotation, a plunger on the inner end of the screw shaft for forcing material through the casing and the front grille thereof, a plurality of brackets extending laterally from one side of the casing, a shaft journalled on the said brackets and disposed in a position spaced from and parallel with the casing, a cutter blade secured to the forward end of the said shaft and extending radially therefrom and in front of the grille, a crank shaft rotatably mounted on the bracket parallel with the said cutter shaft having a crank fixed on its forward end, a slotted lever secured to the cutter shaft and extending radially therefrom, a pin extending longitudinally from the said crank and slidably projecting through the slot of the lever, gearing for rotating the crank shaft during rotation of the screw shaft whereby to swing the radial cutter blade to a downward cutting arc and to an upward return arc, a cam secured on the crank shaft engaging the cutter shaft to axially move the same whereby the cutter moves through a plane close to the grille during its downward cutting movement and through a plane spaced forwardly of the grille during its return movement, and spring means on the cutter shaft yieldingly urging the same against the cam.

2. In a vegetable dicing device, a casing having a cutting grille fixed in the front end thereof, a screw operated plunger movable longitudinally through the casing for forcing material therein through the grille, a shaft journaled exteriorly of the casing and extending parallel therewith, a cutter fixed on the said shaft and extending radially therefrom in front of the grille, crank mechanism connected with the shaft for oscillating the same and the cutter, a rotary cam engaging one end of the shaft for reciprocating the latter to position the cutter close to the grille during its cutting stroke and to dispose the cutter spaced forwardly of the grille during its return stroke, means yieldingly pressing the said shaft against the cam, and gearing for simultaneously rotating the plunger operating screw, the cam and the crank mechanism.

3. In a device of the character described, an elongated casing having a cutting grille in the front end thereof, a screw shaft mounted axially through the rear end of the casing and adapted for longitudinal movement upon rotation, a plunger supported on the inner end of the screw shaft for forcing material through the casing at the front grille thereof, an oscillatory shaft journaled exteriorly of the casing and parallel therewith, a cutter blade secured to the forward end of the said shaft and extending radially inward therefrom and in front of the said grille, a rotary crank shaft mounted parallel with the oscillatory shaft and connected with the latter for oscillating the same, gearing for rotating the crank shaft in unison with the screw shaft for swinging the cutter blade through a downward cutting arc and through an upward return arc, a cam member secured on the crank shaft engaging the rear end of the oscillatory shaft for reciprocating the latter whereby to cause the cutter blade to move through a plane close to the grille during its downward cutting movement and through a plane spaced forwardly of the grille during its return movement, and spring means yieldingly urging the oscillatory shaft against the cam.

THEODORE R. JOHNSON.